United States Patent
Sonnek et al.

(10) Patent No.: US 8,512,448 B2
(45) Date of Patent: Aug. 20, 2013

(54) MULTI-STAGE SCRUBBING SYSTEM AND METHOD FOR ETHANOL VENT STREAMS

(75) Inventors: Daniel W. Sonnek, Lake Crystal, MN (US); Gregory W. Loest, Utica, SD (US)

(73) Assignee: Integroenergy Group, Inc., Utica, SD (US)

( * ) Notice: Subject to any disclaimer, the term of this patent is extended or adjusted under 35 U.S.C. 154(b) by 0 days.

(21) Appl. No.: 12/870,408

(22) Filed: Aug. 27, 2010

(65) Prior Publication Data

US 2011/0277633 A1 Nov. 17, 2011

Related U.S. Application Data

(60) Provisional application No. 61/237,958, filed on Aug. 28, 2009.

(51) Int. Cl.
| | |
|---|---|
| B01D 47/00 | (2006.01) |
| B01D 53/14 | (2006.01) |
| B01D 47/02 | (2006.01) |
| B01D 53/56 | (2006.01) |
| B01D 53/02 | (2006.01) |

(52) U.S. Cl.
USPC ............... 95/223; 95/224; 95/225; 95/230; 95/235; 95/236; 95/237; 95/187; 96/243; 96/265; 96/267; 96/322; 423/220; 423/226; 423/228; 423/245.1

(58) Field of Classification Search
None
See application file for complete search history.

(56) References Cited

U.S. PATENT DOCUMENTS

| | | | | |
|---|---|---|---|---|
| 2,335,855 | A * | 12/1943 | Hall ................................ | 95/191 |
| 4,270,937 | A * | 6/1981 | Adler et al. ..................... | 62/625 |
| 5,087,432 | A * | 2/1992 | Hansen ..................... | 423/240 R |
| 5,273,679 | A * | 12/1993 | Hihara et al. .................... | 95/177 |
| 5,756,058 | A * | 5/1998 | Watanabe et al. ............. | 423/238 |
| 7,803,337 | B1 * | 9/2010 | St. Amant et al. ............ | 423/210 |
| 8,070,863 | B2 * | 12/2011 | Tsangaris et al. .............. | 96/108 |
| 8,156,662 | B2 * | 4/2012 | Carin et al. ..................... | 34/516 |
| 2006/0213370 | A1 * | 9/2006 | Leonard et al. ................. | 96/243 |
| 2008/0213144 | A1 * | 9/2008 | Howard ........................ | 423/210 |
| 2009/0101012 | A1 * | 4/2009 | Gal et al. ......................... | 95/225 |
| 2010/0229725 | A1 * | 9/2010 | Farsad et al. ..................... | 96/74 |
| 2011/0052453 | A1 * | 3/2011 | McLarnon et al. ........... | 422/170 |
| 2011/0174156 | A1 * | 7/2011 | Saunders et al. .................. | 95/46 |
| 2012/0000357 | A1 * | 1/2012 | Roe et al. ......................... | 95/23 |

* cited by examiner

*Primary Examiner* — Frank Lawrence, Jr.
*Assistant Examiner* — Pankti Patel
(74) *Attorney, Agent, or Firm* — Barbara A. Wrigley; Oppenheimer Wolff & Donnelly LLP

(57) ABSTRACT

A multi-stage scrubbing system comprises a pre-scrubber system structured to receive a vent stream therein and pre-scrub the vent stream with a pre-scrubber fluid. The pre-scrubber system includes a first outlet for discharging a pre-scrubbed vent stream and a second outlet for discharging a discharge stream of pre-scrubber fluid. A main scrubber system is fluidly coupled to the first outlet of the pre-scrubber system for receiving and further scrubbing the pre-scrubbed vent stream.

18 Claims, 5 Drawing Sheets

US 8,512,448 B2

MULTI-STAGE SCRUBBING SYSTEM AND METHOD FOR ETHANOL VENT STREAMS

CROSS-REFERENCE TO RELATED APPLICATION(S)

This application claims the benefit of U.S. Provisional Application Ser. No. 61/237,958, filed Aug. 28, 2009, the entirety of which is hereby incorporated by reference.

FIELD OF THE INVENTION

The present invention is generally directed to ethanol processing. More particularly, the present invention is directed to an improved system and method for extracting various organic compounds from a vent stream during ethanol production.

BACKGROUND OF THE INVENTION

Over the past thirty years, significant attention has been given to the production of ethyl alcohol, or "ethanol," for use as an alternative fuel. Ethanol not only burns cleaner than fossil fuels but also can be produced using grains such as corn, which is a renewable resource. Further, the production of ethanol results in new sales outlets for corn, provides additional jobs, and reduces the nation's dependency on foreign oil.

Ethanol is typically produced from corn through either a wet or dry milling process. In the wet milling process, the corn kernel is separated into various components including germ, starch, protein, and fiber, resulting in several co-products. For example, separated germ may be further processed for oil recovery; starch may be saccharified and fermented for ethanol production; and protein and fiber may be used as feed material. In a dry mill process, whole corn is ground, treated with enzymes, and cooked. The resulting "mash" is treated with enzymes to further break down the starchy endosperm tissue into glucose. The converted mash is fermented and distilled, producing ethanol, carbon dioxide, and distiller's dried grains ("DDG"), which are the undissolved solid components (i.e. stillage) remaining in the fermentation tank after the broth is removed. Thus, DDGs are typically comprised of yeast and unfermented components of the corn.

The Dry grind process converts corn into two products, including ethanol and distiller's grains with solubles. If sold as wet animal feed, the co-product is known as distiller's wet grains with solubles ("DWGS"). Conversely, if dried for animal feed, the co-product is known as distiller's dried grains with solubles ("DDGS"). In the standard dry grind ethanol process, one bushel of corn yields approximately 8.2 kilograms (i.e. approximately 18 pounds) of DDGS in addition to the approximately 10.2 liters (i.e. approximately 2.7 gallons) of ethanol. These co-products provide a critical secondary revenue stream that offsets a portion of the overall ethanol production cost.

Typical ethanol plants employ scrubbers on the vent systems coupled to the fermentation vessels and other process gas discharges to minimize the discharge of vaporous ethanol and other volatile organic compounds ("VOCs") from escaping into the atmosphere with the carbon dioxide and other vapors. As appreciated by those skilled in the art, VOCs may include compounds such as acetaldehyde, ethyl acetate, acrolein, and acetone. These scrubbers use fresh water along with a variety of additives to increase the solubility of the ethanol and VOCs. The precipitate of the scrubber is water with a low concentration of ethanol. This water mixture is then reintroduced into the process as make-up water which is then taken through the heating cycles along with the mash. It is in this area that the temperature is often taken over the flash point of ethanol, which in turn allows the ethanol to be lost to a vent system and destroyed in a thermal oxidizer. Consequently, both ethanol and VOCs are discharged into the atmosphere which reduces the ethanol yield and pollutes the environment.

Thus, what is needed is an improved system and method for extracting ethanol and VOCs from a vent stream during ethanol production.

BRIEF SUMMARY OF THE INVENTION

The present invention addresses the foregoing problems by providing a multi-stage scrubbing system that includes a pre-scrubber system structured to receive a vent stream therein and pre-scrub the vent stream with a pre-scrubber fluid. The pre-scrubber system includes a first outlet for discharging a pre-scrubbed vent stream and a second outlet for discharging a discharge stream of pre-scrubber fluid. A main scrubber system is fluidly coupled to the first outlet of the pre-scrubber system for receiving and further scrubbing the pre-scrubbed vent stream.

In accordance with another aspect of the present invention, a multi-stage scrubbing method is provided that includes the steps of directing a vent stream into a pre-scrubber system, pre-scrubbing the vent stream with a pre-scrubber fluid distributed by a fluid distributor, directing the pre-scrubbed vent stream from the pre-scrubber system into a main scrubber system, recirculating at least a portion of a fluid discharge stream from the pre-scrubber system back into the pre-scrubber system through the fluid distributor, scrubbing the pre-scrubbed vent stream with a main scrubber fluid, and recirculating at least a portion of a fluid discharge stream from the main scrubber system into the pre-scrubber system through the fluid distributor.

DETAILED DESCRIPTION OF THE INVENTION

Generally speaking, the present invention is directed to an improved system and method for extracting ethanol and VOCs from a vent stream during ethanol production. As will be described in detail below, a pre-scrubber has been developed that is operable to condense ethanol vapors from a vent stream prior to directing the vent stream to a main scrubber. Thus, the system and method of the present invention is a "multi-stage" scrubbing system. The pre-scrubbing step is accomplished by using low concentration ethanol-water from the main scrubber and circulating it through a pre-scrubber tower that condenses the vapors, thereby concentrating the ethanol. A heat exchanger may be employed that is operable to cool the circulated liquid and allow higher concentrations of ethanol to be obtained. The concentrated ethanol-water solution may be controlled at a level at or near the concentration of the beer feed. This stream of concentrated ethanol-water may then be sent directly to the distillation system where the ethanol is recovered as final product. As will be appreciated by those skilled in the art, the pre-scrubbing step prevents the loss of ethanol during ethanol production. The vapors that exit the pre-scrubber are directed to the main scrubber for final VOC removal before the vapors are exhausted to the atmosphere.

As stated above, one exemplary use of the system and method of the present invention is for extracting various organic compounds from a vent stream during the production of ethanol from a suitable grain, such as corn. However, the system and method of the present invention may be used for extracting selected organic compounds from vent streams during any agricultural or petroleum product processing without departing from the intended scope of the present invention.

Figure 1:
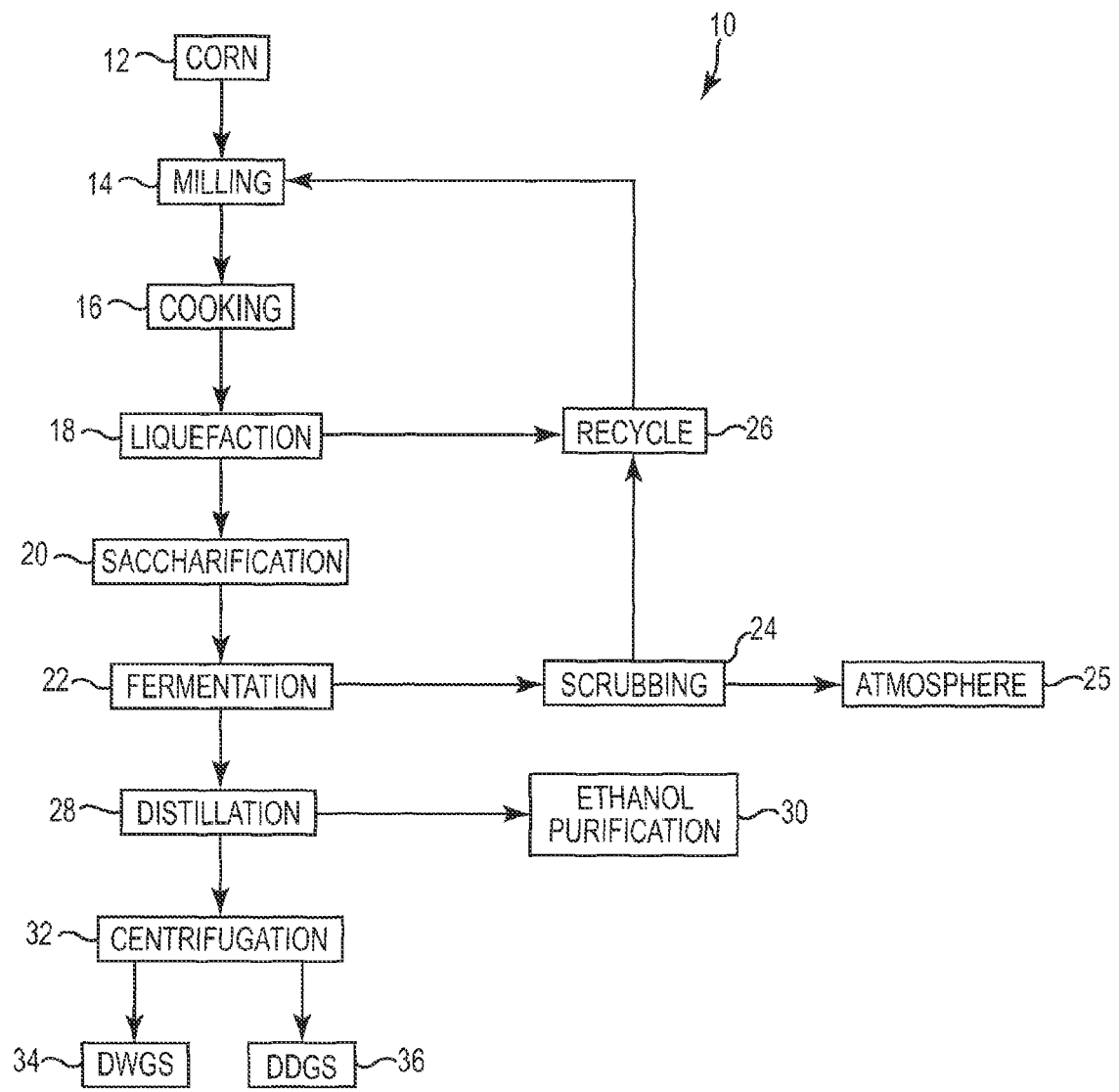
FIG. 1 is a flow diagram illustrating a typical dry grind process for manufacturing ethanol.

FIG. 1 is a flow diagram illustrating a typical dry grind ethanol process 10. The process 10 begins at step 12 where the type of grain that will be used for ethanol production is selected. Because corn is the most common grain that is used for the production of ethanol, the dry grind process 10 will be described with reference to corn for purposes of example and not limitation. Although virtually any type and quality of corn may be used, one common type of corn is known as "No. 2 Yellow Dent Corn." The "No. 2" refers to a quality of corn having certain characteristics as defined by the National Grain Inspection Association as generally known in the art. "Yellow Dent" refers to a specific type of corn as also generally known in the art. The industry average for ethanol yield in a dry grind plant is approximately 10.2 liters (i.e. approximately 2.7 gallons) of ethanol produced per 25.4 kilograms (i.e. one bushel) of No. 2 Yellow Dent Corn.

The process continues with a milling step 14 wherein dried whole corn kernels are passed through hammer mills in order to grind the kernels into meal or a fine powder. The ground meal is mixed with a suitable liquid, such as water, to create a slurry. Additionally, a commercial enzyme known as alpha-amylase may be added to the slurry. This slurry is then heated in step 16 to temperatures above 100° C. and allowed to cook in a pressurized "jet cooking" process. Jet cooking refers to a cooking process performed at elevated temperatures and pressures. The jet cooking process helps to break apart the starch granules present in the endosperm of the kernel, and the added enzymes function to break down the starch polymer into small fragments. Thus, the starch becomes gelatinized. The cooked corn mash is then allowed to cool and is held at a temperature between about 80° C. and about 95° C. in a liquefaction step 18. During the liquefaction step 18, additional alpha-amylase may also be added. As appreciated by those skilled in the art, holding the mash at the lower temperature allows the alpha-amylase to hydrolyze the gelatinized starch into maltodextrins and oligosaccharides (i.e. chains of glucose sugar molecules) to produce a liquefied mash or slurry.

The liquefaction step 18 is followed by a saccharification step 20 and a fermentation step 22. As will be appreciated by those skilled in the art, these two steps may be combined and occur simultaneously in many commercial dry grind ethanol systems. When combined, these steps are referred to in the industry as "simultaneous saccharification and fermentation." In the saccharification step 20, the liquefied mash is first cooled to about 30-50° C. Then, a second enzyme known as glucoamylase is added. The addition of glucoamylase to the liquefied mash completes the breakdown of the starch into simple sugar (i.e. glucose). The saccharification step 20 may occur while the fermentation vessel is being filled with the mash in preparation for the fermentation step.

In the fermentation step 22, yeast is added to the corn mash to begin the process of metabolizing the simple sugars into ethanol. As will be appreciated by those skilled in the art, a common strain of yeast known as *Saccharomyces cerevisae* is typically chosen due to its quick and efficient production of ethanol. The mixture of yeast and corn mash is fermented for approximately two days to allow the simple sugars to be converted into (1) ethanol and (2) carbon dioxide. The other components of the corn mash, including protein and oil, are substantially unchanged by the fermentation process. After fermentation, the fermentation mash ("beer") will contain about 8-12% ethanol by weight, plus soluble and insoluble solids from the remaining grain components.

The carbon dioxide produced in the fermentation vessel may then be vented to and passed through a scrubber in step 24 to remove ethanol vapors and VOCs prior to releasing the stream to the atmosphere in step 25. The scrubber typically utilizes fresh water along with a variety of additives to increase the solubility of the ethanol and VOCs. The precipitate of the scrubber is water with a low concentration of ethanol. This scrubber water may be recycled back into the process in step 26 by directing the water into the slurry tank where the ground corn meal is mixed with liquid to create the slurry. Alternatively, the scrubber water may be recycled back into the process at another suitable location, such as in a distillation tank during a subsequent distillation step.

The beer contained within the fermentation vessel is then sent to a distillation vessel in step 28 for distillation and dehydration. Optionally, the beer may be stored in a "beer well" prior to being sent to the distillation vessel. The beer well may be used to store the fermented beer and supply a controlled stream of beer to the distillation vessel at specified times. As appreciated by those skilled in the art, distillation is the process of separating mixtures based on differences in there volatilities in a boiling liquid mixture. Thus, distillation is a physical separation process and not a chemical reaction. At sea level, water vaporizes at 100° C. while alcohol vaporizes at about 73° C. This difference in vaporization temperature allows for the separation of water from ethanol upon heating the mixture in a distillation vessel.

More particularly, in the distillation step 28 fermented beer is pumped into the distillation vessel where it is boiled to vaporize the ethanol. The ethanol vapor is condensed in the distillation vessel, and liquid ethanol exits the top of the distillation vessel at about 95% purity (i.e. 190 proof) where it is directed into an ethanol purification unit at step 30. The distillation process may also produce a vent stream comprised of carbon dioxide and ethanol, which may be directed through the scrubber along with the vapors produced in the fermentation step 22. Thus, the ethanol that is scrubbed from both the fermentation and distillation vent streams may be recycled back into the process in any suitable manner as previously discussed.

In order to create an ethanol/gasoline blend, it is necessary to remove the roughly 5% of water that remains in the liquid ethanol. This may be accomplished by passing the 95% pure ethanol through a molecular sieve dehydration column to remove the residual water and create a final product that is almost 100% ethanol (i.e. roughly 200 proof). The resulting anhydrous ethanol is then ready to be used for motor fuel purposes. However, the anhydrous ethanol is commonly blended with another petroleum product, such as gasoline, prior to being used as a motor fuel.

The combination solid and liquid product that remains after the distillation step 28 is known as "whole stillage." As appreciated by those skilled in the art, whole stillage may include, among other components, non-fermented starch and the protein, oil, and fiber components of the corn. Whole stillage is a valuable co-product of ethanol processing because it may be used as a feed ingredient for animals, which helps ethanol producers to offset the cost of ethanol production. Although the whole stillage may be used as a feed ingredient without further modification, it typically undergoes further processing prior to being fed to animals. In one exemplary method of processing the whole stillage, the stillage is sent through a centrifugation step 32 in order to separate the insoluble solids or "wet cake" from the liquid or "thin stillage." After centrifugation, the thin stillage and wet cake may be used to create several types of feed, including DWGS at step 34 and DDGS at step 36.

In order to produce the DWGS, the thin stillage may be sent to an evaporator to boil away moisture, leaving a thick syrup containing the dissolved solids from the fermentation step. This concentrated syrup may be mixed with the centrifuged wet cake, and the mixture may be sold as DWGS to animal feedlots. Alternatively, in order to produce the DDGS, the wet cake and concentrated syrup mixture may simply be dried with any suitable drying means and sold to animal feedlots.

Figure 2:
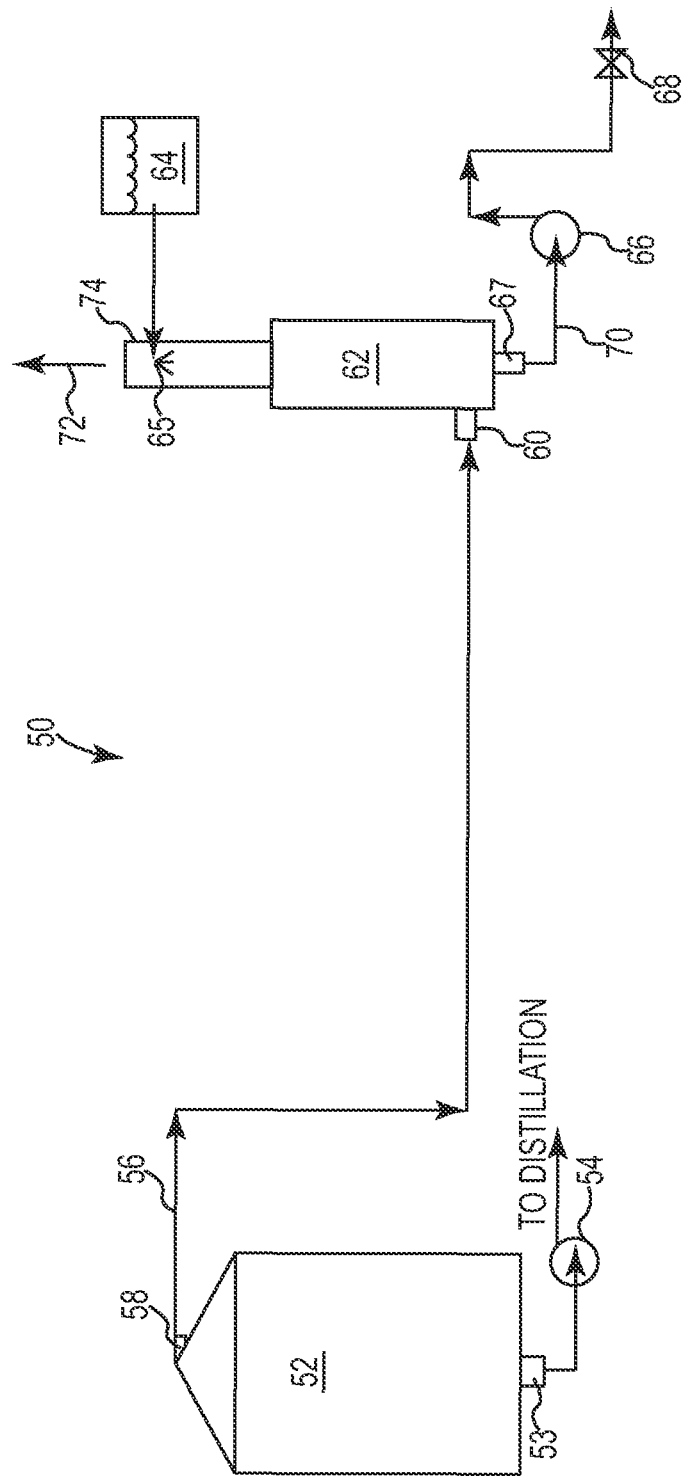
FIG. 2 is a circuit diagram illustrating one exemplary embodiment of a single-stage scrubbing system that operates in accordance with the dry grind process of FIG. 1.

FIG. 2 is a circuit diagram illustrating one exemplary embodiment of a single-stage scrubbing system 50 that operates in accordance with the dry grind process 10 described in detail above with reference to FIG. 1. For purposes of simplicity, only a selected few components of the ethanol processing system are illustrated in FIG. 2.

Particularly, the scrubbing system 50 includes a fermentation vessel 52 containing the mixture of corn mash and yeast. The fermented corn mash, or beer, is then directed through an outlet 53 of the fermentation vessel 52 and pumped to a distillation vessel with a beer feed pump 54 where the ethanol is recovered in any suitable manner such as that previously described. A carbon dioxide vent stream 56 containing both ethanol vapors and VOCs is directed out of the fermentation vessel 52 through an outlet 58 and diverted through a suitable pipe system to an inlet 60 of a scrubber column 62, such as a spray condenser or other suitable scrubbing means. As the carbon dioxide vent stream 56 travels up the scrubber column 62, water from a suitable water source 64 is sprayed down the column in a counter-current fashion with a suitable fluid distributor 65. As the water is being sprayed down from the top of the scrubber column 62, it "wets" the inner surface and packing of the column and collects ethanol vapor, water vapor, and other pollutants that are escaping with the carbon dioxide vent stream 56 in the bottom of the column 62 as scrubber water. A suitable control means, such as a scrubber water return pump 66 and control valve 68, are fluidly coupled to an outlet 67 in the bottom of the scrubber column 62 for controllably recycling a stream of scrubber water 70 back into the slurry tank where the ground corn meal is mixed with liquid to create the slurry. Alternatively, the stream of scrubber water 70 may be recycled back into the process at another suitable location, such as in a distillation vessel where the ethanol is distilled for recovery as final product. As appreciated by those skilled in the art, any suitable control means capable of recycling the stream of scrubber water 70 into another portion of the processing system may be used.

The forgoing scrubbing step results in a substantially clean oxide stream 72 that exits the scrubber column 62 through a suitable vent system 74 and is released into the atmosphere. Although the effectiveness of different scrubber columns will vary, the resulting oxide stream 72 is typically about 98% "clean." As previously discussed, the batch of scrubber water produced by the scrubber column 62 is entrained with the carbon dioxide, ethanol and other organic compounds captured from the carbon dioxide vent stream 56. In a typical system, the stream of scrubber water 70 may comprise approximately 2-5% ethanol.

As will be appreciated by those skilled in the art, the scrubber column 62 may comprise any suitable means for scrubbing ethanol and organic compounds from a vent stream. Examples of suitable scrubbing means include, but are not limited to, random packing, structured packing, or spray towers. Further, the fluid distributor 65 may comprise any suitable type of fluid distribution means for delivering the make-up water including, but not limited to, spray nozzles or a distributor that is operable to disperse a substantially continuous layer of water along the inner surfaces and packing of the scrubber column 62.

As will further be appreciated by those skilled in the art, the various components of the exemplary scrubbing system 50 including the fermentation vessel 52, beer feed pump 54, scrubber column 62, and scrubber water return pump 66 may be fluidly coupled together with any suitable piping system. The piping system may be formed from any suitable material that is capable of withstanding the temperature and pressure of the vent and fluid streams circulating through the system including, but not limited to, various metals, ceramics, plastics, fiberglass, or concrete. The requisite dimensions of the pipes in the piping system will vary depending upon numerous factors including, but not limited to, the size of the fermentation vessel, the amount of carbon dioxide vapor produced in the fermentation vessel, the volume and rate of the water cycled through the scrubber column, and the like. For example, with fermentation vessels having a capacity of about 5.5 million gallons, the portion of the piping system between the outlet 58 of the fermentation vessel 52 and the inlet 60 of the scrubber column 62 may be about 30 to 36 inches in diameter.

The piping system may be fluidly coupled to the various inlets and outlets of the scrubbing system 50 described above in any suitable, fluid-tight manner as will be appreciated by those skilled in the art. Exemplary coupling means may include, but are not limited to, welding, compression fit, or the like. Further, gaskets or other suitable sealing means may be disposed at the interface between a pipe and the component to which it is fluidly coupled in order to reduce or eliminate any sources of leakage.

Although ethanol processing systems that include a single scrubber column for scrubbing a carbon dioxide vent stream prior to being exhausted into the atmosphere are an improvement over prior systems that exhausted the carbon dioxide vent stream straight into the atmosphere, numerous problems still exist with such single scrubber systems. For example, although the single scrubber column 62 captures a large portion of the ethanol from the carbon dioxide vent stream in liquid form and recycles the liquid back into the process for use as make-up water for the corn mash slurry, when used in a subsequent cooking step the temperature of the slurry is driven up to about 85° C. which is above the flashpoint of ethanol. As a result, the ethanol is revaporized and lost through the vent system.

Further, as ethanol processing plants continue to push their processing rates (i.e. the quantity of ethanol being produced per unit of time) the single scrubber column becomes overworked and consequently cannot keep the exhaust stream from the column clean. As a result, many processing plants have turned to adding chemical additives such as sodium bisulfate or ammonium bisulfate to the make-up scrubber water to improve the absorption of VOCs during scrubbing. These chemical additives improve absorption by breaking down the surface tension of the scrubber water. However, this process adds expense to the overall production cost, which in turn drives up the price of ethanol for the consumer or reduces potential profits for the producer.

In summary, single-stage scrubbing systems such as the one illustrated in FIG. 2 feed a carbon dioxide vent stream containing organic compounds directly into a single scrubber column and rely on the affinity of the scrubbing water to the organic compounds contained in the vent stream to cause an entrainment of the organic compounds into the once-through scrubbing fluid. This entrained scrubber water is then recycled back into process or routed to another destination for ultimate disposal as waste. Although enhancement chemicals are sometimes added to the scrubbing water to enhance the affinity of the scrubbing water to the targeted organic compounds, these enhancement chemicals amount to excess chemical reactionaries that further contaminate discharge streams and do not have an overall positive impact on the ethanol production process.

As will be described in further detail to follow, the present invention is an improvement over such single-stage scrubbing systems and operates by cooling the carbon dioxide vent stream from the fermentation vessel (or other sources) prior to directing the vent stream into a main scrubber column. Consequently, the actual volume of recovered organic compounds is increased and not substantially eliminated as in previous scrubbing systems by other volatile means, such as by burning. Thus, the recovered organic compounds are extracted from the environment rather than discharged into the environment.

Figure 3:
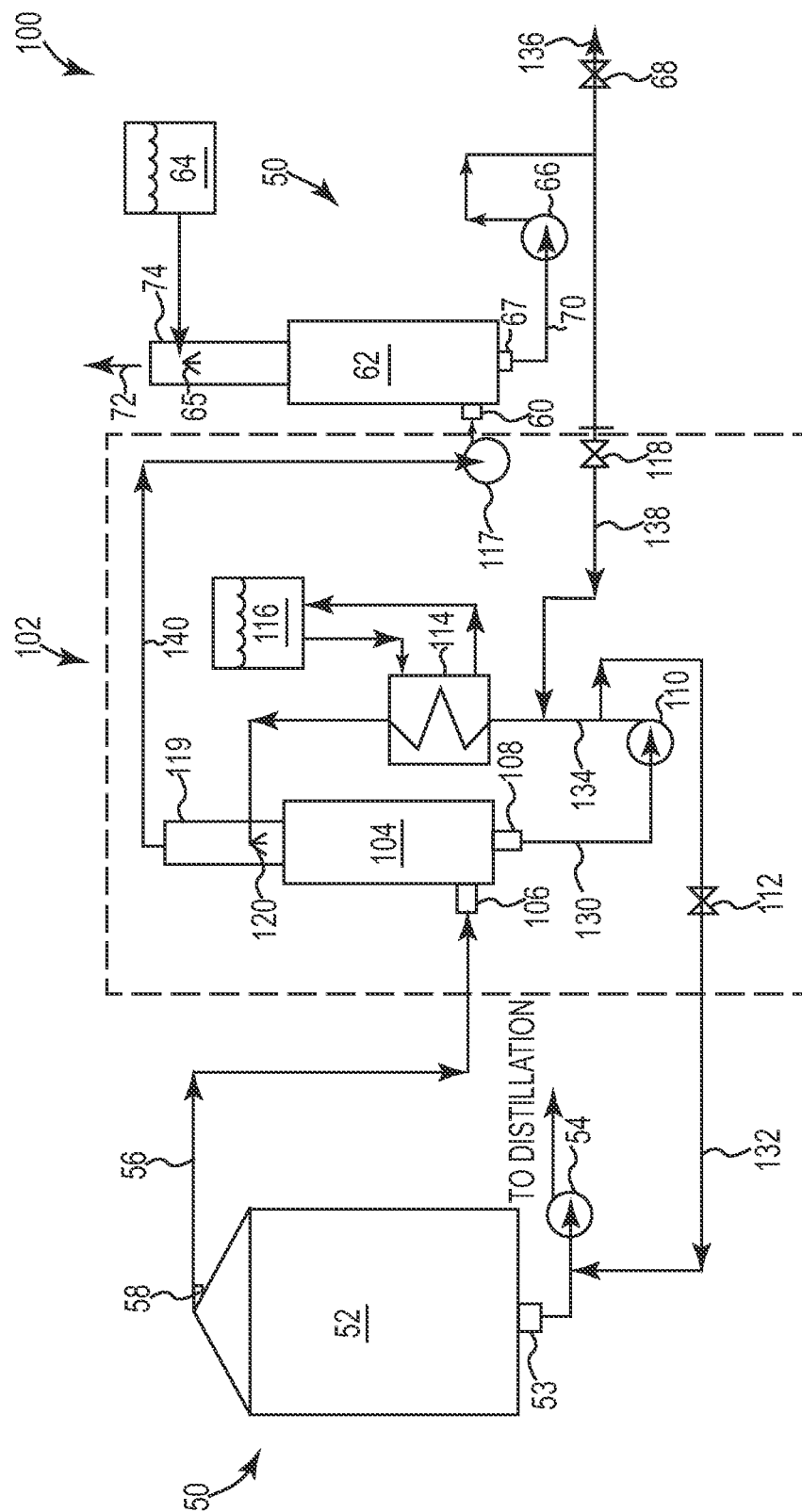
FIG. 3 is a circuit diagram illustrating one exemplary embodiment of a multi-stage scrubbing system in accordance with the present invention.

FIG. 3 is a circuit diagram illustrating one exemplary embodiment of a multi-stage scrubbing system 100 in accordance with the present invention. Generally speaking, the multi-stage scrubbing system 100 may be structured as a combination of a single-stage scrubbing system, such as the scrubbing system 50 previously described, and a pre-scrubber system 102 operably incorporated therein. For purposes of clarity, the exemplary pre-scrubber system 102 of the present invention is shown bounded by a series of broken lines. Thus, one skilled in the art will appreciate that removal of the pre-scrubber system 102 from the multi-stage scrubbing system 100 may yield the single-stage scrubbing system 50 of FIG. 2.

As illustrated in FIG. 3, the exemplary multi-stage scrubbing system 100 includes the fermentation vessel 52, beer feed pump 54, scrubber column 62 (hereinafter referred to as the "main" scrubber column 62), scrubber water return pump 66 (hereinafter referred to as the "main" scrubber water return pump 66), and control valve 68 previously described with reference to FIG. 2. Additionally, the pre-scrubber system 102 generally includes a pre-scrubber column 104 having an inlet 106 and an outlet 108, a pre-scrubber return pump 110, a control valve 112, a heat exchanger 114, a chilled water source 116, a blower 117, a control valve 118, and a fluid distributor 120. Particularly, the pre-scrubber system 102 is configured such that the inlet 106 of the pre-scrubber column 104 is in fluid communication with the outlet 58 of the fermentation vessel 52, the outlet 108 of the pre-scrubber column 104 is in fluid communication with the pre-scrubber return pump 110 and control valve 112, the heat exchanger 114 is fluidly coupled to the chilled water source 116 for circulating chilled water therethrough, the blower 117 is fluidly coupled to a vent system 119 of the pre-scrubber column 104, and the control valve 118 is in fluid communication with the main scrubber water return pump 66 for controlling flow of the stream of main scrubber water 70 from the main scrubber column 62 into the heat exchanger 114 for use as make-up water by the fluid distributor 120 in the pre-scrubber column 104.

Although any suitable pre-scrubber column 104 may be used, the pre-scrubber column 104 may be substantially similar to the main scrubber column 62 previously described. However, as will be discussed in further detail to follow, the pre-scrubber column 104 may require several modifications to the internal components of the scrubber column. One modification is providing suitable components that allow for an increased amount of fluid flow through the pre-scrubber column 104 as compared to the main scrubber column 62. Another modification is structuring the pre-scrubber column 104 such that at least a portion of the scrubber water collected at the bottom of the pre-scrubber column 104 may be recirculated through the heat exchanger 114 and used as cooled make-up water for the pre-scrubbing process.

The heat exchanger 114 generically illustrated in FIG. 3 may comprise any suitable type of heat exchanger as will be appreciated by those skilled in the art including, but not limited to, a shell and tube heat exchanger, a double pipe heat exchanger, a finned pipe heat exchanger, a spiral pipe heat exchanger, a u-tube heat exchanger, a stacked plate heat exchanger, or the like. Further, any suitable flow design may be used such as parallel flow, counter flow, or cross flow. Although the heat exchanger 114 is illustrated as circulating chilled water from a chilled water source 116, any suitable liquid or gas may be used without departing from the intended scope of the present invention. The cooling liquid or gas may maintain its phase throughout the cooling process, or alternatively may experience a change in phase during the cooling process.

Now that the exemplary components of the pre-scrubber system 102 have been described, the general operation of the multi-stage scrubbing system 100 will be discussed in detail. As illustrated in FIG. 3, instead of directing the carbon dioxide vent stream 56 containing both ethanol vapors and VOCs out of the fermentation vessel 52 directly into the main scrubber column 62, the carbon dioxide vent stream 56 is directed into the inlet 106 of the pre-scrubber column 104 which is placed in front of and in series with the main scrubber column 62. As the carbon dioxide vent stream 56 travels up the pre-scrubber column 104, make-up water is sprayed down the column 104 in a counter-current fashion with the fluid distributor 120. As the water is being sprayed down from the top of the pre-scrubber column 104, it wets the inner surface and packing of the column 104 and collects ethanol vapor, water vapor, and other pollutants that are escaping with the carbon dioxide vent stream 56 from the fermentation vessel 52 as pre-scrubber water. The pre-scrubber water return pump 110 and the control valve 112 are fluidly coupled to the outlet 108 of the pre-scrubber column 104 and are operable for controllably recycling a stream of pre-scrubber water 130 to various other portions of the system. Particularly, the pre-scrubber water return pump 110 and control valve 112 direct a first portion 132 of the stream of pre-scrubber water 130 to distillation where the ethanol is recovered as final product, and a second portion 134 of the stream of pre-scrubber water 130 to the heat exchanger 114 where it merges with a second portion 138 of the stream of main scrubber water 70 to form the make-up water for the pre-scrubber column 104. A first portion 136 of the stream of main scrubber water 70 is directed to the slurry tank, distillation vessel, or the like as will be described below.

In one exemplary embodiment the heat exchanger 114 is operable to cool the combined second portions 134 and 138 of the scrubber water streams to a temperature within a range between about 16° C. and about 27° C. Any suitable ratio of pre-scrubber water to main scrubber water in the combined stream may be used. As will be appreciated by those skilled in the art, the ratio may be controlled and modified as necessary with the control valves 112 and 118.

The stream of pre-scrubber water 130 exiting the outlet 108 of the pre-scrubber column 104 is preferably maintained at or near the ethanol level of the beer feed from the fermentation vessel 52. Exemplary ethanol levels of the stream of pre-scrubber water 130 may be in a range between about 12% and about 15%, although higher or lower levels are also contemplated. The pre-scrubbing system 102 may operate to maintain the stream of pre-scrubber water 130 at or near the ethanol level of the beer feed with any suitable mass or density flow meter, such as a Coriolis type mass or flow meter. Such "proof meters" are known to those skilled in the art, and may be operably coupled to a controller that is programmed with data tables that relate, for example, temperature, density, and concentration data. Alternatively, the ethanol concentration may be monitored and controlled manually using a hydrometer and temperature reference chart. Various other suitable means for maintaining a desired ethanol concentration in the stream of pre-scrubber water 130 are also possible as will be appreciated by those skilled in the art.

Generally speaking, make-up water is circulated through the pre-scrubber column 104 at a greater flow rate/volume than the make-up water circulated through the main scrubber column 62. In one exemplary embodiment, the flow through the pre-scrubber column 104 may be about 10 times greater than the flow through the main scrubber column 62.

As further illustrated in FIG. 3, a pre-scrubber vent stream 140 exits the pre-scrubber column 104 through the vent system 119 and is directed to the inlet 60 at the bottom of the main scrubber column 62. Optionally, a fan or blower unit such as the blower 117 may be operably coupled to the portion of the piping system between the pre-scrubber column 104 and the main scrubber column 62 to blow the pre-scrubber vent stream 140 into the main scrubber column 62. The blower 117 is preferably operable to maintain a steady, desirable flow rate of the vent stream 140 into the main scrubber column 62. Any suitable fan or blower unit that is operable to transfer a substantially steady stream of vapors between the pre-scrubber column 104 and the main scrubber column 62 may be used including, but not limited to, a centrifugal fan, a positive displacement blower, an eductor, or the like. The blower 117 may preferably include a means for adjusting the flow rate/volume to any desired level.

As the pre-scrubber vent stream 140 travels up the main scrubber column 62, make-up water is sprayed down the column in a counter-current fashion with the fluid distributor 65. As the water is being sprayed down from the top of the main scrubber column 62, it collects the majority of the ethanol vapor, water vapor, and other pollutants that were not collected by the pre-scrubber column 104 during the pre-scrubbing stage. After the "second" stage of scrubbing, the concentration of ethanol in the stream of scrubber water 70 may be about 1% or less. The main scrubber water return pump 66 and control valve 68 are fluidly coupled to the outlet 67 in the bottom of the column 62 for controllably recycling the first portion 136 of the stream of main scrubber water 70 into a slurry tank, distillation vessel, or the like, and for injecting the second portion 138 of the stream of main scrubber water 70 into the second portion 134 of the stream of pre-scrubber water near the inlet of the heat exchanger 114 as described above to form the pre-scrubber make-up water. Thus, substantially any amount of ethanol that happens to slip through the pre-scrubber column 104 is picked-up by the main scrubber column 62 and recycled back into the pre-scrubber 104 as make-up water. This ensures that the multi-stage scrubbing system 100 picks-up almost 100% of the ethanol for recovery as final product.

Because the pre-scrubber column 104 operates at a much higher flow rate/volume than the main scrubber column 62, the second portion 138 of the stream of scrubber water 70 typically accounts for a small percentage of the combined pre-scrubber make-up water. For example, the second portion 138 of the stream of main scrubber water 70 may account for approximately 5-10% of the total volume of pre-scrubber water, with the second portion 134 of the stream of pre-scrubber water 130 accounting for the other 90-95%. Obviously, these percentages may vary depending upon the precise flow rates in the scrubber columns and are presented merely for purposes of example and not limitation.

Due to the presence of the pre-scrubber column 104, the concentration of ethanol and VOCs in the vent stream 140 that is received by the main scrubber column 62 is greatly reduced. As a result, the load on the main scrubber column 62 is also much less than it would otherwise be if receiving the carbon dioxide vent stream 56 directly from the fermentation vessel 52. From a mechanical standpoint the vapors are cooler, potentially on the order of about 15-25° C. cooler, which corresponds with a reduced specific volume of the vapors as well as reduced vapor velocities in the main scrubber column 62.

In view of the foregoing, the main scrubber column 62 receives a vent stream 140 having vapors that are smaller, compressed, and much cooler than the vapors in the carbon dioxide vent stream 56. It follows that the reduced loading reduces the amount of make-up water required by the main-scrubber column 62 and minimizes or eliminates the need for using chemicals in the make-up water to "clean-up" the oxide stream 72.

As will be appreciated by those skilled in the art, the pre-scrubber system of the present invention may include additional or different components without departing from the intended scope of the invention. Thus, the exact configuration of the pre-scrubber system 102 set forth in FIG. 3 is illustrated and described merely for purposes of example and not limitation. Further, the pre-scrubber system of the present invention may be incorporated into any ethanol processing and scrubbing system as will be appreciated by those skilled in the art without departing from the intended scope of the present invention. Therefore, the scrubbing system 50 is described and illustrated in combination with the pre-scrubber system 102 merely for purposes of example and not limitation.

As previously discussed with respect to the scrubbing system 50 of FIG. 2, any suitable piping system may be used to fluidly couple the various components of the multi-stage scrubbing system 100 together with departing from the intended scope of the present invention. Thus, exemplary coupling means such as welding and compression fit may be used to fluidly couple together pipe sections formed from suitable materials such as various metals, ceramics, plastics, fiberglass, or concrete.

Figure 4:
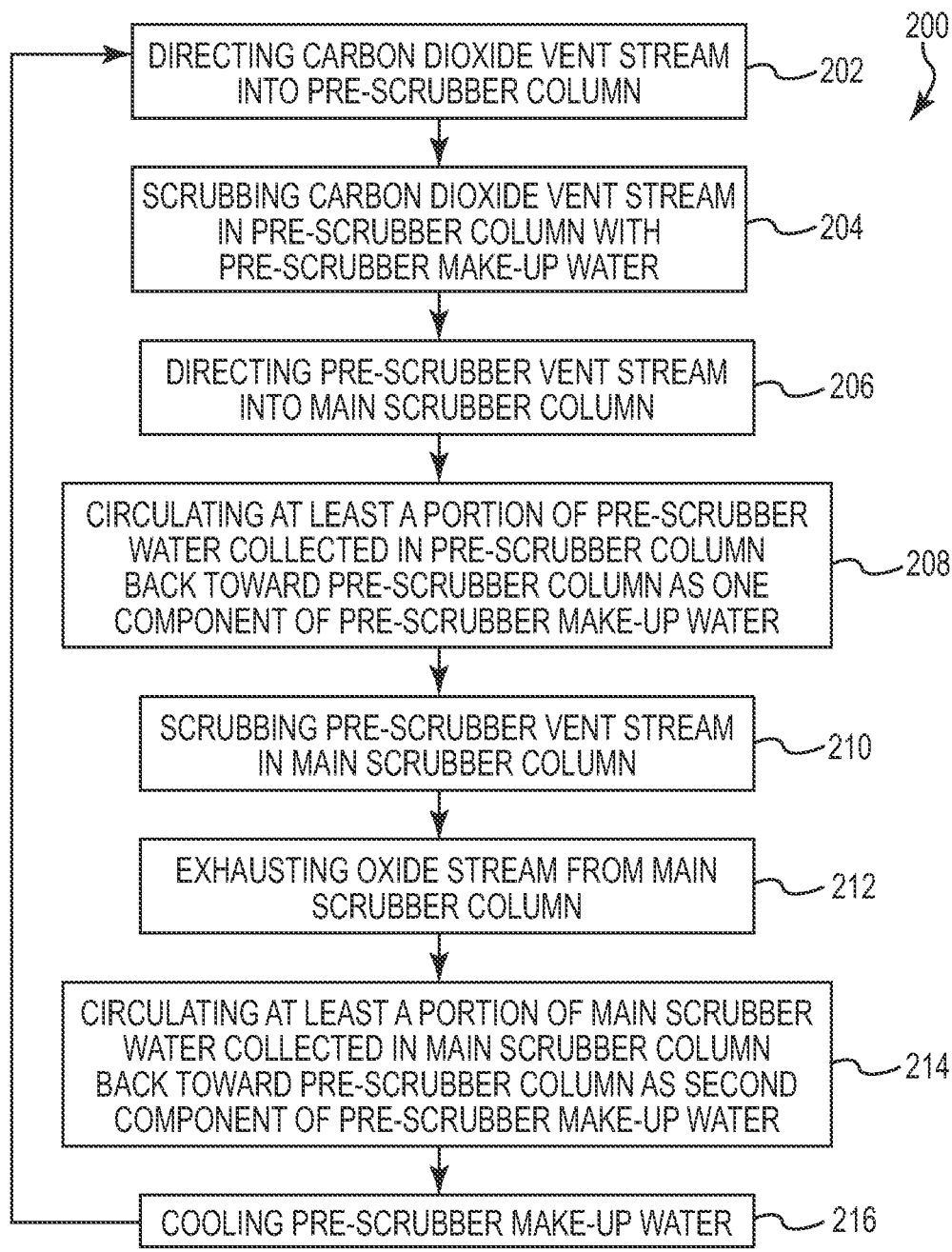
FIG. 4 is a flow diagram illustrating several exemplary steps in a multi-stage scrubbing process.

FIG. 4 is a flow diagram illustrating several exemplary steps in the multi-stage scrubbing process described above with reference to FIG. 3. The multi-stage scrubbing process 200 begins with step 202 where a carbon dioxide vent stream is directed into a pre-scrubber column. The process continues with step 204 where the carbon dioxide vent stream is scrubbed in the pre-scrubber column with pre-scrubber make-up water to remove ethanol vapor, water vapor, and other pollutants that are escaping with the carbon dioxide vent stream. Following the pre-scrubbing step 204, a pre-scrubber vent stream is vented from the pre-scrubber column into a main scrubber column at step 206.

Simultaneously with the venting step 206, at least a portion of the pre-scrubber water collected in the bottom of the pre-scrubber column is recirculated back toward the pre-scrubber column for use as one component of the pre-scrubber make-up water in step 208. Once in the main scrubber, the pre-scrubber vent stream is scrubbed to remove substantially all remaining ethanol vapor, water vapor, and other pollutants in step 210. The process continues at step 212 where a substantially clean oxide stream is vented from the main scrubber.

Simultaneously with the venting step 212, at least a portion of the main scrubber water collected in the bottom of the main scrubber column is recirculated back toward the pre-scrubber column where it is mixed with the pre-scrubber water from step 208 for use as a second component of the pre-scrubber make-up water in step 214. The pre-scrubber make-up water (which is a combination of "exhausted" water from the pre-scrubber and main scrubber) is cooled within a heat exchanger in step 216, and the process 200 repeats until the carbon dioxide vent stream terminates.

Although several exemplary steps were described with reference to the multi-stage scrubbing process 200, those skilled in the art will appreciate that the order and number of steps may be modified without departing from the intended scope of the present invention. Thus, the exemplary steps were provided merely for purposes of example and not limitation.

Figure 5A:
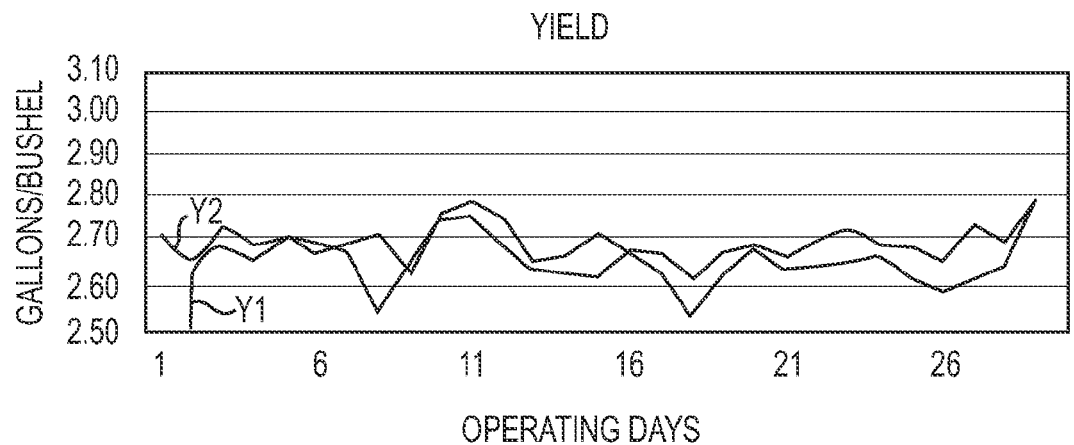
FIGS. 5A and 5B are graphs illustrating the improved yield and pre-scrubber flow, respectively, for one exemplary processing plant having a multi-stage scrubbing system incorporated therein.
Figure 5B:
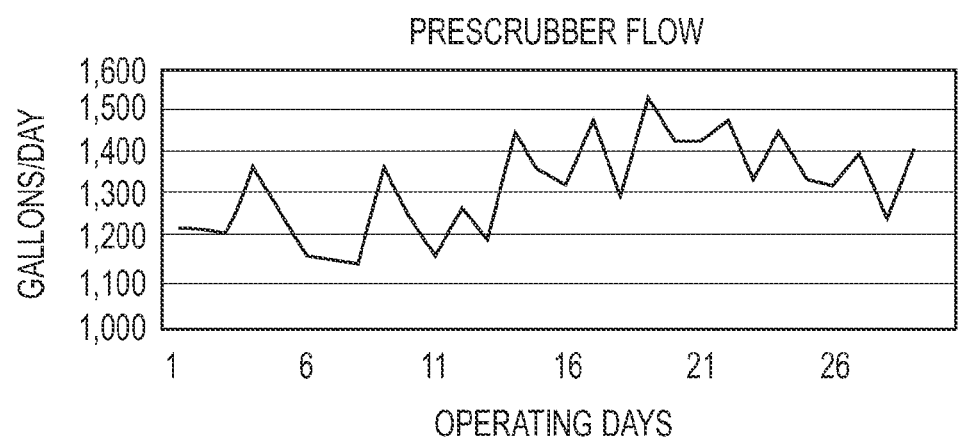

Now that the general structure and operation of a multi-stage scrubbing system in accordance with the present invention has been described, the experimental results from one exemplary ethanol processing plant incorporating a multi-stage scrubbing system will be provided with reference to FIGS. 5A and 5B. Particularly, a pre-scrubber system (similar to the pre-scrubber system 102) was incorporated into a 40 million gallon/year ethanol processing facility having a single-stage scrubbing system (similar to the single-stage system 50) to achieve a multi-stage scrubbing system that resembles system 100.

FIG. 5A is a graph illustrating yield of the processing plant over a period of 29 days in gallons of ethanol per bushel of corn. Particularly, line Y1 depicts the yield of the processing plant using only the single-stage scrubbing system, while line Y2 depicts the yield of the processing plant using the multi-stage scrubbing system in accordance with the present invention. Over the 29 day test period, the single-stage scrubbing process resulted in an average yield of about 2.65 gallons/bushel, while the multi-stage scrubbing process of the present invention resulted in an average yield of about 2.69 gallons/bushel. Thus, the ethanol processing plant realized an improvement in yield of about 1.51% using the multi-stage scrubbing system and method of the present invention.

FIG. 5B is a graph illustrating the pre-scrubber flow rate (in gallons per day) that was required to achieve the average yield of about 2.69 gallons/bushel. Over the 29 day test period, the average daily pre-scrubber flow rate was about 1,325 gallons/day.

Those skilled in the art will appreciate that the improved yield and required pre-scrubber flow rate may vary based upon numerous factors such as the size of the facility (i.e. the amount of ethanol produced), the effectiveness of the main scrubber, the temperature of the pre-scrubber water, and the like. However, theoretical models and other experimental results have shown that improvements in yield even greater than about 1.5% are possible with the multi-stage scrubbing system and method of the present invention.

The system and method of the present invention have been described with reference to scrubbing vent streams from a fermentation vessel merely for purposes of example and not limitation. Thus, the multi-stage scrubbing system may be used to scrub vent streams from any source without departing from the intended scope of the present invention.

Although the present invention has been described with reference to preferred embodiments, workers skilled in the art will recognize that changes may be made in form and detail without departing from the spirit and scope of the invention.

What is claimed is:

1. A multi-stage scrubbing method for improving the yield of ethanol during ethanol production from corn comprising:
    producing a vent stream from the fermentation of corn mash during ethanol production, the vent stream consisting essentially of carbon dioxide, ethanol and volatile organic compounds;
    directing the vent stream into a pre-scrubber system comprising a pre-scrubber column;
    pre-scrubbing and cooling the vent stream with a cooled pre-scrubber fluid distributed by countercurrent flow by a fluid distributor to produce a cooled pre-scrubbed vent stream;
    directing the cooled pre-scrubbed vent stream from the pre-scrubber system into a main scrubber system comprising a column having a fluid flow capacity that is less than the pre-scrubber column, the main scrubber system being fluidly coupled in series to the pre-scrubber system;
    recirculating at least a portion of a fluid discharge stream from the pre-scrubber system back into the pre-scrubber system through the fluid distributor;
    scrubbing the pre-scrubbed vent stream with a main scrubber fluid; and
    recirculating at least a portion of a fluid discharge stream from the main scrubber system into the pre-scrubber system through the fluid distributor,
    wherein said multi-stage scrubbing method improves the yield of ethanol from the ethanol production process by about 1.5%.

2. The multi-stage scrubbing method of claim 1 wherein said pre-scrubber:
    system includes a first outlet for discharging said pre-scrubbed vent stream and a second outlet for discharging said discharge stream of pre-scrubber fluid.

3. The multi-stage scrubbing method of claim 1 further comprising discharging a discharge stream of scrubber fluid through an outlet in said main scrubber system and recirculating at least a portion of the discharge stream of scrubber fluid to the pre-scrubber system through the fluid distributor.

4. The multi-stage scrubbing method of claim 3 wherein the pre-scrubber fluid is a mixture of the discharge streams from the pre-scrubber system and the main scrubber system.

5. The multi-stage scrubbing method of claim 4, further comprising cooling the pre-scrubber fluid by a heat exchanger prior to pre-scrubbing the vent stream.

6. The multi-stage scrubbing method of claim 5 further comprising directing a first portion of the discharge stream of pre-scrubber fluid to a distillation system and recirculating a second portion of the discharge stream of pre-scrubber fluid to the pre-scrubber system through the fluid distributor.

7. The multi-stage scrubbing method of claim 6 further comprising directing a first portion of the discharge stream of scrubber fluid to a slurry tank and recirculating a second portion of the discharge stream of scrubber fluid to the pre-scrubber system through the fluid distributor.

8. The multi-stage scrubbing method of claim 3 wherein the pre-scrubber system includes an inlet in fluid communication with an outlet of a fermentation vessel for receiving the vent stream.

9. The multi-stage scrubbing method of claim 3, further comprising transferring the pre-scrubbed vent stream to the main scrubber system by a blower operably coupled between the first outlet of the pre-scrubber system and the inlet of the main scrubber system.

10. A multi-stage scrubbing method for improving the yield of ethanol during an ethanol production process comprising:
producing a vent stream from the fermentation of corn mash during ethanol production, the vent stream consisting essentially of carbon dioxide, ethanol and volatile organic compounds;
directing the vent stream into a first scrubber system comprising a first scrubber column;
allowing the vent stream to migrate up the first scrubber column;
scrubbing and cooling the vent stream by distributing a cooled first scrubber fluid by countercurrent flow to wash and cool said vent stream to produce a cooled pre-scrubbed vent stream;
directing the cooled pre-scrubbed vent stream from the first scrubber column into a second scrubber system comprising a second scrubber column, said second scrubber column having a fluid flow capacity that is less than the first scrubber column; and
scrubbing the pre-scrubbed vent stream with a second scrubber fluid,
wherein said multi-stage scrubbing method improves the yield of ethanol from the ethanol production process by about 1.5%.

11. The multi-stage scrubbing method of claim 10, further comprising collecting a fluid discharge stream from the first scrubber system and recirculating at least a portion of the fluid discharge stream back into the first scrubber system.

12. The multi-stage scrubbing method of claim 11, further comprising collecting a fluid discharge stream from the second scrubber system and recirculating at least a portion of the fluid discharge stream from the second scrubber system into the first scrubber system.

13. The multi-stage scrubbing method of claim 12 wherein the first scrubber fluid is a mixture of the fluid discharge streams from the first and second scrubber systems.

14. The multi-stage scrubbing method of claim 13 wherein a first portion of the fluid discharge stream from the first scrubber system is directed to a distillation system and a second portion of the fluid discharge stream from the first scrubber system is recirculated into the first scrubber system.

15. The multi-stage scrubbing method of claim 14 wherein a first portion of the fluid discharge stream from the second scrubber system is directed to a slurry tank and a second portion of the fluid discharge stream from the second scrubber system is recirculated into the first scrubber system.

16. The multi-stage scrubbing system of claim 13, further comprising providing a first pump and a first control valve for controllably recirculating the fluid discharge stream from the first scrubber system.

17. The multi-stage scrubbing system of claim 16, further comprising providing a second pump and a second control valve for controllably recirculating the fluid discharge stream from the second scrubber system.

18. The multi-stage scrubbing method of claim 13, the cooled first scrubber fluid is cooled in a heat exchanger.

* * * * *